Patented Apr. 17, 1945

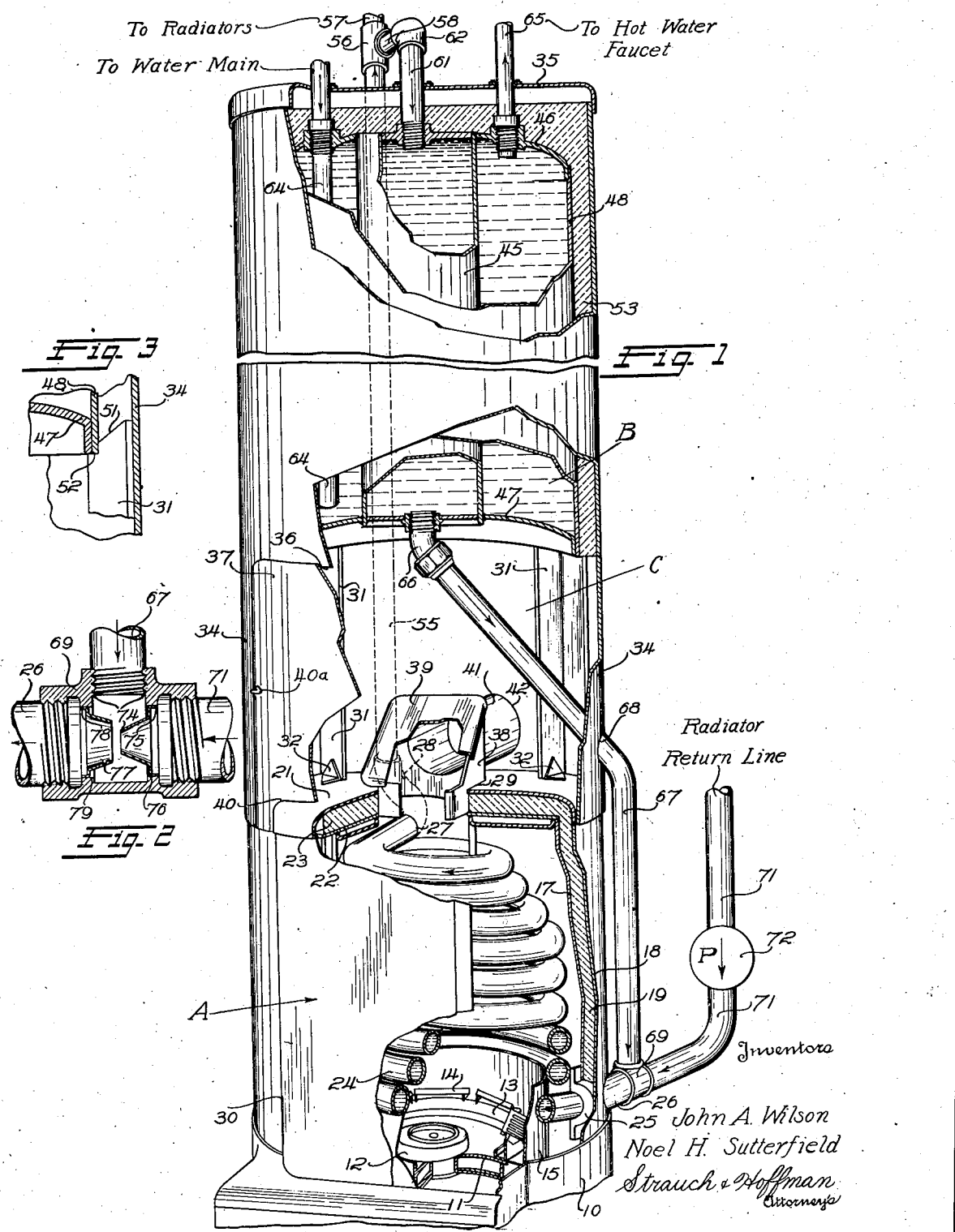

2,373,731

UNITED STATES PATENT OFFICE 2,373,731

HEATING UNIT

John A. Wilson and Noel H. Sutterfield, Detroit, Mich., assignors to The Timken-Detroit Axle Company, Detroit, Mich., a corporation of Ohio Application July 24, 1940, Serial No. 347,332

8 Claims. (Cl. 122—32)

The present invention relates to water heating apparatus, more particularly to units embodying combined systems for space heating and also domestic hot water heating.

Although systems of this general character have been heretofore proposed, they have not been altogether successful from the standpoint of compactness, cost, durability and efficiency, particularly when designed for present day low cost housing developments, wherein the floor space available for such units is extremely limited.

It is the major object of this invention to provide a novel water heating apparatus for supplying both hot water for radiation and domestic hot water, which is of extremely compact design, requires a minimum of floor space, is very efficient, even when embodied in small capacity units, is fool-proof, has a long life, and yet is low in cost and simple in design.

Another important object is to provide a combined space and domestic hot water heating unit, in which the water from the furnace takes divided paths through the radiation system and a heat exchanger for the domestic hot water, and returns to the furnace, and embodies means for effecting forced circulation of the water along one of the paths without producing reversal of flow in the other path.

A further object is to provide the furnace return line of a divided, forced-flow water heating system with novel means for preventing improper reversals of flow.

Another object is to provide a water heating apparatus embodying a furnace unit and a tank unit, located one above the other in spaced apart relationship to provide a flue chamber between them, and having certain piping passing through the flue chamber and placing the furnace and tank in fluid communication.

A still further object is to provide a combined space heating and domestic hot water heating apparatus having a novel heat exchanging tank unit embodying a heating tank completely surrounded by an outer tank containing the domestic hot water supply to be heated, the two tanks having a common wall of single thickness, through which heat is transmitted from one tank to the other.

Further objects will become apparent as the specification proceeds in connection with the annexed drawing, and from the appended claims:

In the drawing,

Figure 1 is a perspective view, with parts broken away, of a heating unit embodying the present invention;

Figure 2 is a sectional view of the novel T employed in the system shown in Figure 1; and Figure 3 is a fragmental sectional view showing the manner in which the supports are associated with the tank assembly.

With continued reference to the drawing, wherein like reference characters have been employed to designate like parts throughout the several views thereof, the heating unit is made up of a bottom burner unit A, and a tank unit B, located vertically above the furnace unit and spaced therefrom to provide a flue chamber C.

The furnace unit comprises a base 10 having a hearth 11 closing the bottom portion thereof. A rotary oil and air distributor 12 is located centrally of the hearth and projects oil and air outwardly toward a flame rim 13, where the oil is combusted and passes upwardly through a plurality of metal grilles 14. An upstanding cylindrical metal wall 15 surrounds the rim and grille structure. Since the foregoing structure is not claimed per se, and as it is shown more fully in Sutterfield Patent No. 2,102,763, granted December 21, 1937, it will not be further described.

The furnace unit is provided with concentric inner and outer walls 17 and 18 having an insulating blanket 19 of any suitable character disposed therebetween. The chamber is provided with a substantially flat top 21 and an inner wall 22 and an insulating blank 23 is interposed between them. A heating coil 24 has is lower end surrounding wall 15 and decreases in diameter as it passes upwardly in the combustion chamber, and it will be hereinafter referred to as the beehive coil. The lower end of the coil is anchored to a fitting 25 in the combustion chamber and has a terminal portion 26 located outside the chamber. The upper end of the coil passes out of the upper part of the combustion chamber through an opening 27, and has a terminal portion 28. The top of the furnace unit is provided with a central opening 29 for a purpose that will presently appear. The front part of the furnace unit is also provided with a removable section 30, for affording access to the interior of the combustion chamber.

The novel water tank unit is so designed that it may be assembled with the heater as a complete unit at the factory, or if desired, the tank unit alone may be supplied to owners of, and readily be incorporated in, heaters of the character shown in the aforementioned Sutterfield patent. The manner in which the tank unit is associated with the furnace unit at the factory to provide a compact, efficient structure will now be set forth.

Rising from the top of the furnace unit are a plurality of supports 31 of angle form, which are secured to the top by angle brackets 32, which are preferably welded to both the supports and to the top. The tank unit is supported directly upon supports 31 and is provided with an enclosing jacket 34 and a top 35. Jacket 34 extends downwardly below the bottom of the tank unit and tightly fits the upper end of the furnace unit and if desired may be secured thereto by spot-welding or the like. Supports 31 are preferably disposed with one leg directed radially and the other leg tangentially, as shown in Figure 1. The tangential leg of each support is preferably secured by welding to the inner surface of jacket 34.

The lower part of the jacket accordingly cooperates with the supports 31 to provide a rigid unitary cylindrical supporting structure. The front of the jacket is provided with an opening 36 to afford access to the flue chamber C, and it is closed by a curved closure plate 37, which is cut away at 40 to clear section 30 of the furnace unit, and is detachably secured to the jacket by wing screws 40a.

A smoke hood 38 is fitted into opening 29 and is provided with a hinged door 39. The smoke hood also embodies a horizontally directed pipe section 41 which projects through an opening 42 in jacket 34 and is connected to a stack in well known manner.

The tank unit comprises an elongated cylindrical tank 45 located preferably centrally of the unit. Welded to the outer wall of the tank adjacent the top and bottom thereof are a pair of annular plates 46 and 47, respectively, and the outer edges of the latter are welded to a cylindrical shell 48. Plates 46, 47 and 48 cooperate with the outer cylindrical wall of tank 45 to define an outer annular tank.

The tank unit is preferably supported in the jacket structure by supports 31. As shown in Figure 3, the upper end of each support is provided with an inclined surface 51, and an upwardly facing surface 52, so that the tank unit will be properly centered with respect to the jacket. During assembly, inclined surfaces 51 function to direct tank unit 45 into proper seating engagement with surfaces 52.

The spaces between the tank unit and jacket 34 and top 35 are preferably filled with a blanket of heat insulating material 53, to reduce the heat loss by radiation to the surrounding atmosphere. No heat insulation is employed at the bottom of the tank unit because the heat liberated by the smoke hood structure into chamber C more than balances any heat that would be lost from this region.

If it is desired to convert an existing heating unit of the type disclosed in the aforementioned Sutterfield patent into a combined domestic hot water and space heating unit, the entire tank unit just described, including the tank, the supporting legs, the insulation and enclosing casing, is mounted directly on top of the heating unit, and when so installed provides a neat, compact unit having the appearance of a single assembly. When installed as just described, legs 31 may be welded to the top of the heating unit, as previously described, or, if desired, they may merely gravitationally rest upon the top of the heating unit, especially since the depending portion of the jacket fits snugly around the upper portion of the heater and accurately centers the tank unit.

From the foregoing, it is apparent that we have provided a very compact heating structure, requiring only a small circular area of floor space and yet, by the efficient correlation of the various units, the head room required by our unit is not excessive. Also, all the parts are efficiently protected against heat loss and by associating the water tank unit directly with the flue chamber, any heat liberated by the flue gases is utilized to directly heat the water. The novel piping system employed in our heating unit will now be described.

Outlet terminal 28 of the beehive coil is connected to a pipe 55 which is connected in turn to a T 56. A pipe 57 is connected to T 56 and leads to the radiators of a hot water heating system, in well known manner. A second pipe 58 is connected to T 56 and the latter to a pipe 61, communicating with the upper part of tank 45, by means of an elbow 62.

Since the heated water from the beehive coil flows directly into the upper part of tank 45, and the latter functions to transmit heat directly through its cylindrical wall into the water contained in the annular domestic hot water tank, it will be hereinafter termed the heating water tank.

Secured to the top of the annular tank, and preferably extending from a point near the bottom thereof, is a pipe 64 which is connected to the cold water supply line. A second pipe 65 preferably is connected to the upper part of the annular tank at a point diametrically opposite from pipe 64, and leads to the hot water faucets of the domestic water system, in well known manner. Since the annular tank receives heat solely from the cylindrical wall 45, it will be hereinafter termed the heated water tank.

As the water in tank 45 cools, it circulates to the bottom and is returned to inlet terminal 26 of coil 24 by means of an elbow 66, a pipe 67 extending through an opening 68 in jacket 34, and a T 69 of novel construction. The latter is connected to inlet terminal 26 of beehive coil 24 and to a return pipe 71 from the cool water return line of the radiator system. A pump 72 is preferably incorporated in line 71 to effect more rapid circulation of the water in well known manner, and the pump may be driven by a motor, (not shown) as will be readily understood by those skilled in the art.

The novel T construction of the invention is shown more clearly in Figure 2, and it includes a frustro-conical member 74 having a flange 75 pressed into a bore 76, in one arm of the T. A similar frustro-conical member 77, but having a larger diameter, has a flange 78 pressed into a bore 79 in the arm of the T adjacent terminal 26 of the beehive coil. Members 74 and 77 project toward each other to form an injector or aspirator structure, so that water forced into the T through pipe 71 will produce a low pressure zone adjacent the free ends of members 74 and 77 and cause the water in pipe 67 to be drawn into the T and forced along through pipe 26 into the beehive coil.

The directions of flow of the water through the system are indicated in the various figures by arrows applied to the parts. The heated water emerging from outlet terminal 28 of the beehive coil passes upwardly in pipe 55 and divides at T 56, part of it going to the heating system and part of it flowing into the top of tank 45. Since the rate of flow of the water downwardly in tank 45 is governed solely by the rate of heat transfer from it to the annular tank, the rate of diversion of flow through T 56 will be automatically determined by the rate at which water is withdrawn from the annular tank through pipe 65. As previously explained, the water, after it is cooled in tank 45, passes through pipe 67 and returns to the furnace unit inlet.

The other flow of water passing through T 56 is conducted by pipe 57 to the radiators in well known manner, and upon being cooled is returned by pipe 71 and pump 72 and T 69. The returning water entering the T through pipe 71 undergoes an increase in velocity upon passing through the throat of member 74, and this produces two highly advantageous results. First, it establishes a low pressure region between members 74 and 77, which produces a definite downward circulation in pipe 67, and secondly it insures that pump 72 will not effect a reversal of flow in pipe 67 and force the water upwardly into the heating water tank. If desired, members 74 and 77 may be cast integrally with the T.

When the unit is provided with the piping just described, the combination will supply heat for a hot water heating system and also furnish domestic hot water within the limits of its B. t. u. capacity. Either a gravtiy system, wherein heat transfer is effected by natural circulation of the water, or a forced system, wherein the water is made to circulate by a pump, may be used.

With either a gravity or forced system, the novel unit will supply hot water to the radiation system as well as supply domestic hot water in the wintertime, and in the summertime or non-heating season, will supply domestic hot water only.

With a gravity system the following controls are preferably used. A thermostat is placed in the living quarters or other space to be heated, and two aquastats are placed in the outlet side of the water system. One aquastat is used to limit the maximum temperature of the hot water in the system and is usually referred to as the "high unit" aquastat. The other aquastat is referred to as the "low limit" control and is used to prevent the water from falling below a predetermined temperature. The simplest form of thermostatic control of house heating is to use a line wattage thermostat connected in parallel with the low limit aquastat. With this form of control, the thermostat starts the burner when heat is needed in the radiator system and shuts the burner off when the demand for heat has been met. With the type of system just described, a valve in pipe 57 or 71 is necessary to close off the heating system and prevent heat from being transmitted to the radiators in the summertime. The valve may be manually operated but is preferably actuated by a motor which in turn is controlled by the thermostat, so that when heat is needed in the radiators it will open, and when heat is not required it will close.

When a forced heating system is used the same number and type of controls just described will be employed. However, instead of actuating a motor operated valve in the heating system main, the thermostat is used to open and close the circuit of pump 72. During winter operation, when the thermostat demands heat, it closes the pump circuit which pushes the hot water in the heater coil through the mains to the radiators, from which point it is drawn back through the return line 71 to the pump intake. During this period the water is also made to flow through the domestic water section of the tank unit, due to T 69. However, during the period that the thermostat has the pump shut off, heated water circulates by gravity downwardly through control tank 45.

Although we have shown a system embodying a pump located in the return line for producing more positive circulation, it is to be understood that the pump may be placed in other locations than shown and in some instances may be eliminated altogether, without departing from the spirit of the invention. Moreover, we have shown an oil burner for heating the water but it is obvious that the invention is just as advantageous in systems using gaseous or solid fuels, and the appended claims are intended to cover it when it is embodied in such forms.

It is also to be understood that certain changes may be made in the piping without impairing the efficiency of the construction or departing from the spirit of the invention. For instance, the outlet terminal of the beehive coil could be located in the front, rather than the rear of the unit, and be brought up the front wall to T 56, either inside or outside of jacket 34, if the available space at the rear of the unit were inadequate to accommodate it. The inlet terminal of the beehive coil may also be located at the front if desired. Also, the tank unit may embody front and rear sections separated by a common vertical heat-transmitting wall, rather than inner and outer sections. We preferably rely upon natural circulation to divide the hot water flow at T 56, since it greatly simplifies the construction, but, if desired, however, a thermostatically controlled valve may be associated with the inlet or outlet of tank 45 to positively control the flow of water through it.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed and desired to be secured by United States Letters Patent is:

1. In a heat exchange apparatus, an upright furnace unit having a flue opening in its top and reservoir means for conducting a body of water in heat-transmitting relationship to a combustion device located in said unit; an upright tank unit of substantially the same diameter as said furnace unit; means for supporting said tank unit above said furnace unit in vertically spaced relationship thereto; a jacket surrounding said space and cooperating said furnace and tank units to provide a closed flue chamber between said furnace and tank units and having substantially the same diameter as said units; conduit means, including a pipe in said chamber connected to the bottom of said tank unit and inclining downwardly and outwardly and projecting through an opening in said jacket, placing said tank unit in fluid communication with said reservoir means; and a second conduit means, disposed in said flue chamber and extending through a second opening in said jacket and placing said flue opening in communication with the exterior of said jacket.

2. In a heat exchange apparatus, an upright furnace unit having a flue opening in its top and reservoir means for conducting a body of water in heat-transmitting relationship to a combustion device located in said unit; an upright tank unit comprising a central water section and an annular water section; means for supporting said tank unit above said furnace unit in vertically spaced relationship thereto; a substantially cylindrical jacket surrounding said space and overlapping said furnace and tank units to provide a closed flue chamber between said furnace and tank units; conduit means placing the central water section of said tank unit in fluid communication with said reservoir means; a second conduit means, disposed in said flue chamber and placing said flue opening in communication with the exterior of said jacket; comprising an elbow connected to said flue opening and projecting through an opening in said jacket and a third conduit inclining downwardly and outwardly from the bottom of said central water section and passing through said flue chamber; and a layer of insulating material surrounding the outer walls of said tank unit, the bottom of the latter being uninsulated and exposed to heat developed in said flue chamber during operation.

3. In a heat exchange apparatus, an upright furnace unit having a substantially flat top; reservoir means for conducting a body of water in heat-transmitting relationship to a combustion device in said unit; an upright tank unit; a plurality of upright supports mounted on the top of said furnace unit and supporting said tank unit above said furnace unit in vertically spaced relationship thereto; a jacket surrounding said space and cooperating with said furnace and tank units to provide a closed chamber between said furnace and tank units; conduit means placing said tank unit in fluid communication with said reservoir means; and means for securing said jacket to said supports to provide a unitary flue chamber and tank supporting unit, said jacket having a service door opening between two adjacent supports; and a door closing said opening.

4. In a water heating apparatus, an upright furnace unit of generally cylindrical form having a fuel combusting device therein; conduit means in said furnace unit for conducting water from an inlet to an outlet in heat absorbing relationship to said fuel combusting device; said unit having a flue opening in its top; a plurality of upright supports secured to the top of said unit; a tank unit mounted on the upper ends of said supports in substantial vertical alignment with said furnace unit; a jacket surrounding said tank unit and depending in overlapping relationship with said furnace unit, to provide a flue chamber between said furnace and tank units, means for securing said jacket to said supports, means for placing said tank unit in fluid communication with said conduit means; and a flue pipe communicating with said flue opening in said furnace unit and connected to an opening in the side of said jacket.

5. In a water heating apparatus, an upright heating unit of generally cylindrical form and having reservoir means containing a body of water; combustion means for heating the body of water in said reservoir means; a tank unit comprising a tank having inlet and outlet connections and an enclosing shell having a depending cylindrical skirt; means for securing said skirt to the upper portion of said heating unit so as to vertically space said tank above said heating unit and provide a flue chamber therebetween; a plurality of angle members secured to the top of said heating unit in said flue chamber and each having one flange thereof secured to said cylindrical skirt, the other flange of each member providing a seat for the bottom of said tank; and conduit means placing said inlet and outlet connections of said tank unit in communication with said body of water in said reservoir means.

6. The water heating apparatus defined in claim 5, wherein said tank unit comprises a layer of heat insulating material disposed between said tank and shell terminating at the lower edge adjacent the bottom said tank.

7. The water heating apparatus defined in claim 5, wherein the seats, provided by the upper ends of said angle members and upon which said tank rests, face upwardly, said upper ends of said angle members also having inwardly directed abutments adapted to engage the outer surface of said tank and maintain it in spaced relationship to said shell.

8. In a combined space heater and domestic hot water heater, a space heating system comprising combustion heat transfer means having a vertical height and having a water inlet adjacent its bottom and a water outlet adjacent its top, a conduit extending upwardly from said outlet for connection to a radiator, and a radiator return line extending downwardly to said inlet; and a water heating system comprising a vertically disposed elongated, generally cylindrical tank located entirely above said combustion heat transfer means, a connection leading into the top of said tank from the adjacent portion of said upwardly extending conduit, a connection leading from the bottom of said tank to said downwardly extending conduit, means operatively associated with said last-mentioned connection and said downwardly extending conduit effective to induce a flow of water downwardly through said tank when subjected to the convection flow through said downwardly extending conduit to said combustion heat transfer means; a water reservoir surrounding said tank, a service water inlet conduit connected with the bottom of said reservoir, and a service water outlet conduit connected with the top of said reservoir.

JOHN A. WILSON.
NOEL H. SUTTERFIELD.